United States Patent
McCartney et al.

(10) Patent No.: US 9,608,500 B2
(45) Date of Patent: *Mar. 28, 2017

(54) PORTABLE GENERATOR SYSTEM FOR PROVIDING TEMPORARY POWER TO AN ELECTRICAL-DISTRIBUTION SYSTEM

(71) Applicant: VMC Power Systems, Angels Camp, CA (US)

(72) Inventors: Mark C. McCartney, Mokelumne Hill, CA (US); Nicolas V. Valente, Angels Camp, CA (US)

(73) Assignee: VMC Power Systems, Angels Camp, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/952,229

(22) Filed: Nov. 25, 2015

(65) Prior Publication Data

US 2016/0211729 A1    Jul. 21, 2016

Related U.S. Application Data

(63) Continuation of application No. 14/202,374, filed on Mar. 10, 2014, now Pat. No. 9,203,276.

(Continued)

(51) Int. Cl.
*H02P 9/00* (2006.01)
*H02K 11/33* (2016.01)
*H02K 5/00* (2006.01)
*F02B 63/04* (2006.01)
*H01F 27/00* (2006.01)

(52) U.S. Cl.
CPC ............ *H02K 11/33* (2016.01); *F02B 63/047* (2013.01); *H01F 27/002* (2013.01); *H02K 5/00* (2013.01)

(58) Field of Classification Search
None
See application file for complete search history.

(56) References Cited

U.S. PATENT DOCUMENTS 6,700,214 B2    3/2004  Ulinski
9,203,276 B1 *  12/2015 McCartney .............. H02K 5/00
(Continued)

OTHER PUBLICATIONS

"Homepage for EE/Econ 458 (Tesfatsion), Economic Systems for Electric Power Planning," updated Mar. 28, 2015, accessed on Sep. 1, 2015, 4 pages. Retrieved from: <http://www2.econ.iastate.edu/classes/econ458/tesfatsion/Home458Team.htm>.
(Continued)

*Primary Examiner* — Tho D Ta
(74) *Attorney, Agent, or Firm* — Kilpatrick Townsend & Stockton LLP

(57) ABSTRACT

A portable generator produces secondary voltage to feed a portable trailer mounted transformer through secondary cables. Transformer voltages are stepped up to primary levels with disconnects/fuses protecting the transformer and generator. From the fuses a primary underground cable feeds a junction box mounted on the bottom side of the portable trailer for underground applications. Overhead applications include a temporary overhead erectable structure with overhead disconnects. A temporary ground rod with a grounding cable is used to establish a path to ground and a common neutral system for the portable trailer and all components of the portable generator apparatus and system.

20 Claims, 11 Drawing Sheets

Related U.S. Application Data

(60) Provisional application No. 61/789,514, filed on Mar. 15, 2013.

(56) References Cited

U.S. PATENT DOCUMENTS

| | | |
|---|---|---|
| 2002/0153726 A1 | 10/2002 | Sumner |
| 2007/0093280 A1 | 4/2007 | McKay |
| 2007/0296223 A1 | 12/2007 | Saylor |
| 2010/0090543 A1 | 4/2010 | Cobb |
| 2011/0298287 A1 | 12/2011 | Cobb |

OTHER PUBLICATIONS

Brown, Bill, P.E., "Section 4: System Voltage Considerations," accessed on Sep. 1, 2015, 4 pages. Retrieved from: <http://static.schneiderelectric.us/assets/consultingengineer/appguidedocs/section4_0307.pdf>.

Cleveland, Cutler, J., "Smart Grid," Encyclopedia of Earth, published Oct. 7, 2009, updated Apr. 24, 2011, accessed on Sep. 1, 2015, 6 pages. Retrieved from: <http://www.eoearth.org/view/article/51cbeee37896bb431f69af3d/>.

* cited by examiner

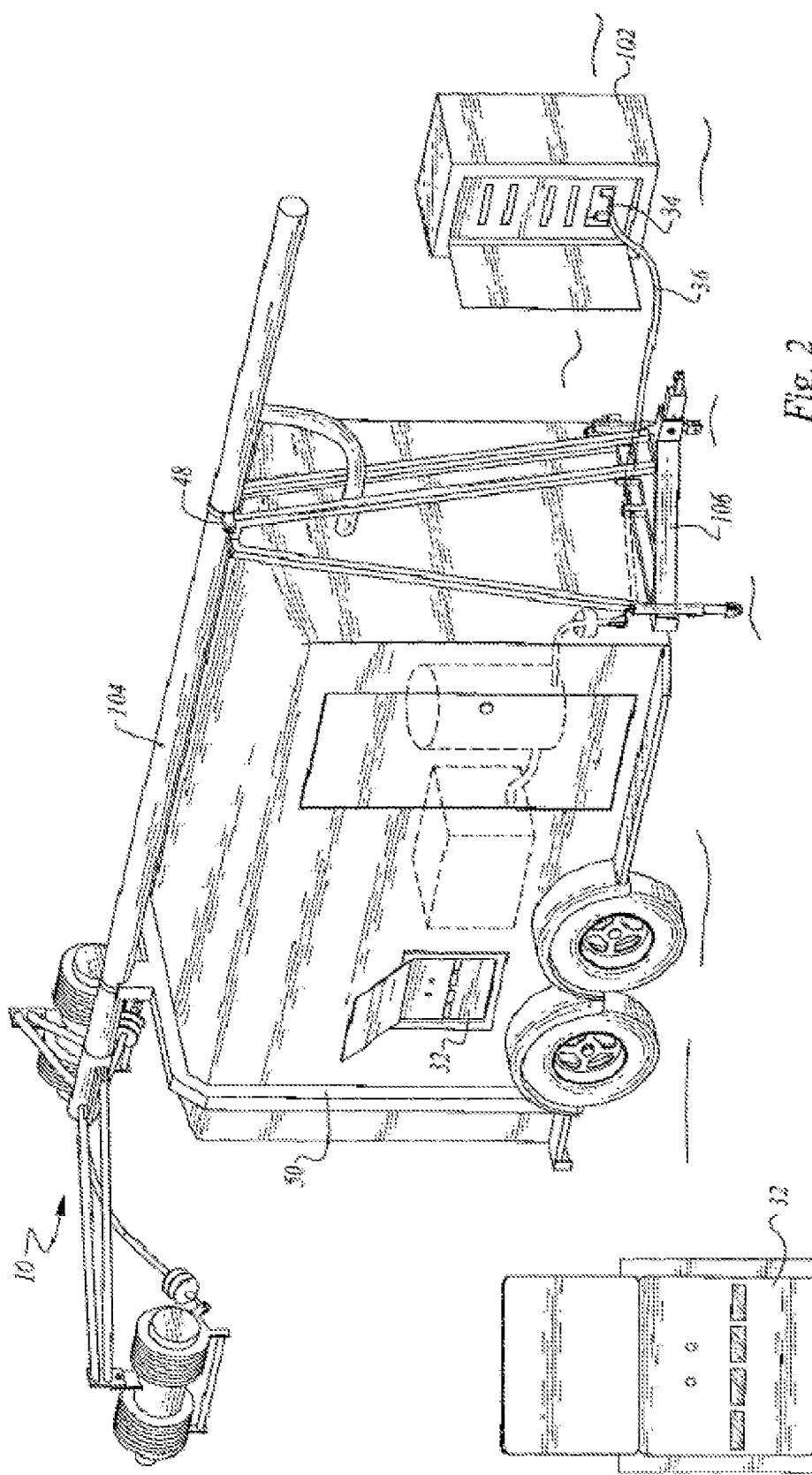

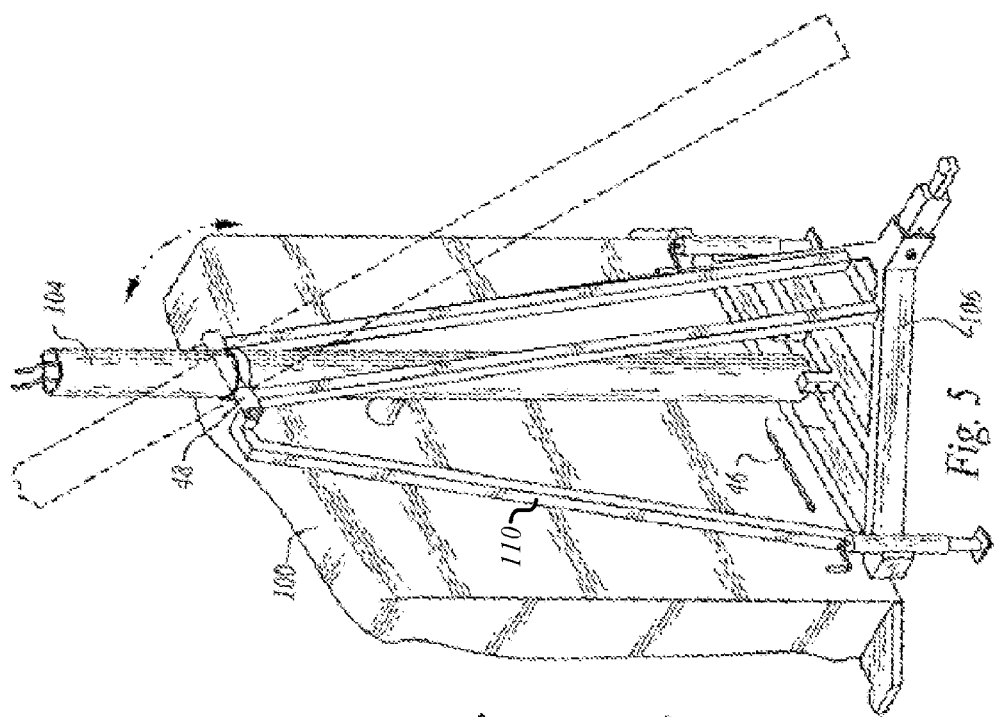
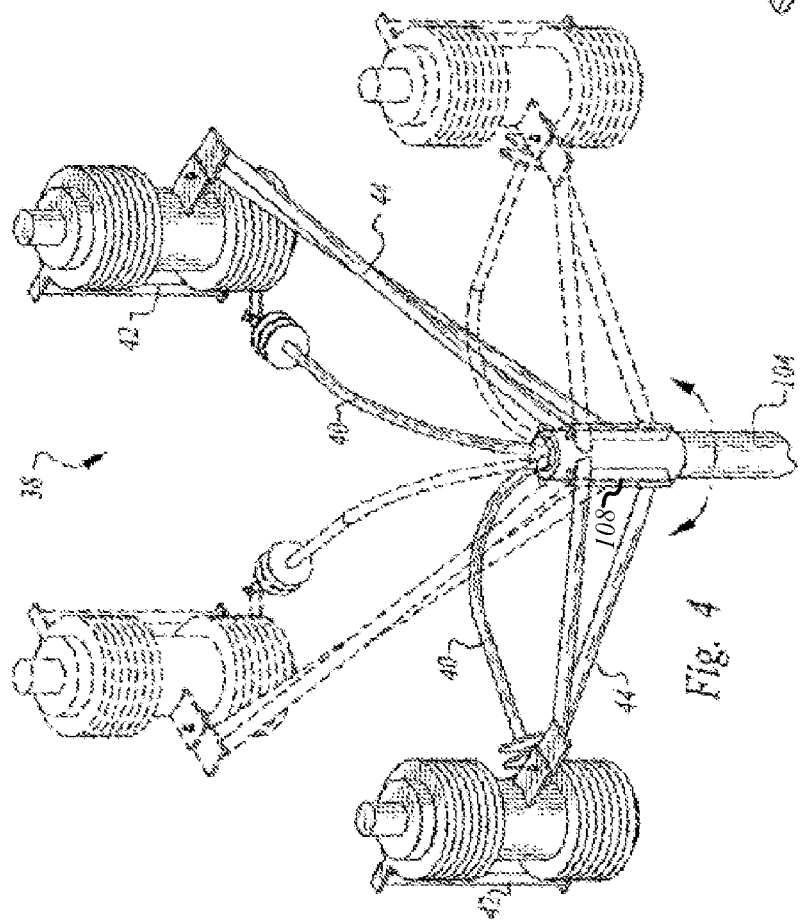

PORTABLE GENERATOR SYSTEM FOR PROVIDING TEMPORARY POWER TO AN ELECTRICAL-DISTRIBUTION SYSTEM

CROSS-REFERENCE RELATED TO APPLICATIONS

This application is a continuation of U.S. patent application Ser. No. 14/202,374, filed on Mar. 10, 2014, entitled "Portable Generator System for Providing Temporary Power to an Electrical-Distribution System," which application claims priority to U.S. Provisional Patent Application No. 61/789,514, filed on Mar. 15, 2013, the disclosures of which are hereby incorporated by reference in their entirety for all purposes.

BACKGROUND OF THE INVENTION

The portable primary voltage generator ("PPVG") apparatus, system and method are safe, efficient, and economical ways to provide temporary power to underground or overhead distribution power lines while a section of the line or circuit is de-energized with no other possible way of being re-energized. The PPVG energizes the distribution power line with the same voltage standards that the utility or owner of the power line are required to meet by either 1) parallel connection of the PPVG with the electrical grid then separating the PPVG and section of line wished to be isolated, or 2) first separating and de-energizing the intended section of the power line then reenergizing the de-energized section of the power line using the PPVG. These PPVG procedures allow maintenance and or repairs to be performed on de-energized conductor and/or apparatus and minimize the impact to customer service. By de-energizing a section of line and then re-energizing the load side of the section being worked upon the following benefits are accomplished, without limitation:
1) maintenance or repair on de-energized power lines which is safer and more efficient than working on energized lines;
2) provides an option for continued power service to be delivered to the customer(s) when a line must be de-energized because of the scope of work to be done on the line;
3) reduces outages or impact of outages and, thus, increases reliability of electrical power and improves a utility company's negotiations over rates and revenue with the local public utility commission, for example in the State of California—the California Public Utility Commission ("CPUC").

Accordingly, there is a need for addressing problems associated with providing continued electrical service to end users when a portion of the electrical distribution line is de-energized for maintenance or repair, or has been knocked out as a result of severe weather conditions or terrorist attack.

There is likewise a need to reduce outages or impact of outages attendant to maintenance or repair of power lines or circuits, severe weather conditions or terrorist attack.

There is a corresponding need for an apparatus, system and/or method for maintenance or repair on de-energized power lines which is safer and more efficient than working on energized lines.

Further it would be useful if multiple features can be incorporated into one portable primary voltage generator apparatus, system and method to provide allowing for applications to both underground and overhead electrical power lines.

SUMMARY OF THE INVENTION

The connections of the PPVG to electrical power distribution lines are made by utility employees at either an underground interface or an overhead interface. At no time will the operator of the PPVG touch or come within the distance limits set by the Occupational Safety and Health Administration ("OSHA") for energized apparatus or conductors. To assure proper voltage is maintained to utility customers, utility engineers assess the section of line that will be energized by the PPVG to assure the load on the section of line will be within the capabilities of the PPVG. The PPVG suitable to the energy load requirements of the section of line will be maneuvered into position (and structure erected for overhead applications) under the direction and supervision of a qualified employee of the utility or owner of the line. Prior to the PPVG being connected to distribution lines the PPVG is grounded using temporary ground source and grounding cable(s) with all components of the PPVG at the same potential. Then the PPVG is connected to the secondary generator for a predetermined secondary voltage range through the secondary interface, with the circuit breaker at the secondary generator closed. The secondary generator is started energizing the PPVG to primary levels, with an embodiment of the PPVG providing and delivering a voltage range from 601 volts to 35,000 volts. When the desired and designed proper voltage, amperage, and frequency are verified through telemetry the secondary generator circuit breaker will be opened de-energizing the PPVG. At that time the connections are made to either the underground interface or the overhead interface with disconnects/fuses open. The PPVG operator will then close the circuit breaker energizing the PPVG to the bottom side of the open disconnects/fuses. Then the utility employee closes the disconnect(s)/fuse(s), reenergizing the section of distribution line and restoring power to the customers of the utility. Voltage will be monitored and maintained using telemetry and a secondary voltage regulator to maintain the delivered voltage within the standards set by the utility or owner of the line. The operation is reversed for removal of the PPVG.

An embodiment of the PPVG includes a telemetry unit which provides remote information gathering and monitoring for the secondary voltage interface, the transformer temperature, the primary current transformer, and the primary potential transformer.

An embodiment of the PPVG includes transformer primary protective devices selected from fuses, switches, fused switches, sectionalizer(s), line recloser(s), grounding bank(s), or any other type of automatic, automated, or controlled device to protect the transformer from load side fault.

An embodiment of the PPVG includes a primary underground interface that provides a trailer mounted junction box with load break and dead break bushing applications.

An embodiment of the PPVG includes an overhead interface that provides a trailer mounted overhead erectable structure which when erected yields a structure for overhead disconnect/fuses for utility connections.

An embodiment of the PPVG includes an oil containment system that provides a catch basin held within the trailer to contain oil in the event of a transformer failure or leak.

An embodiment of the PPVG includes a fire extinguishing/suppression system that provides an integral plumbing assembly to deliver a fire extinguishing chemical to PPVG components.

BRIEF DESCRIPTION OF THE DRAWINGS

FIG. 2 depicting, inter alia, a perspective view of an embodiment of a portable primary voltage generator 10 having the primary underground interface 36 connected to an underground junction box 102 while a section of the underground source line or circuit is de-energized with no other possible way of being re-energized, with the overhead erectable structure 104 in a stowed position on the trailer 1000.

FIG. 3 depicts planar front view of a telemetry display and control panel 32 of an embodiment of a portable primary voltage generator 10.

FIG. 4 depicts a perspective view of the overhead erectable structure 104 for the embodiment of a portable primary voltage generator 10 of FIG. 1, depicting, inter alia, the 360 degree adjustable positioning of the primary overhead interface 38.

FIG. 5 depicts a perspective view of an embodiment of a portable primary voltage generator 10 and the various trailer 1000 ground support assemblies 106 and pivot assembly 108 for the overhead erectable structure 104.

DETAILED DESCRIPTION

Figure 1:
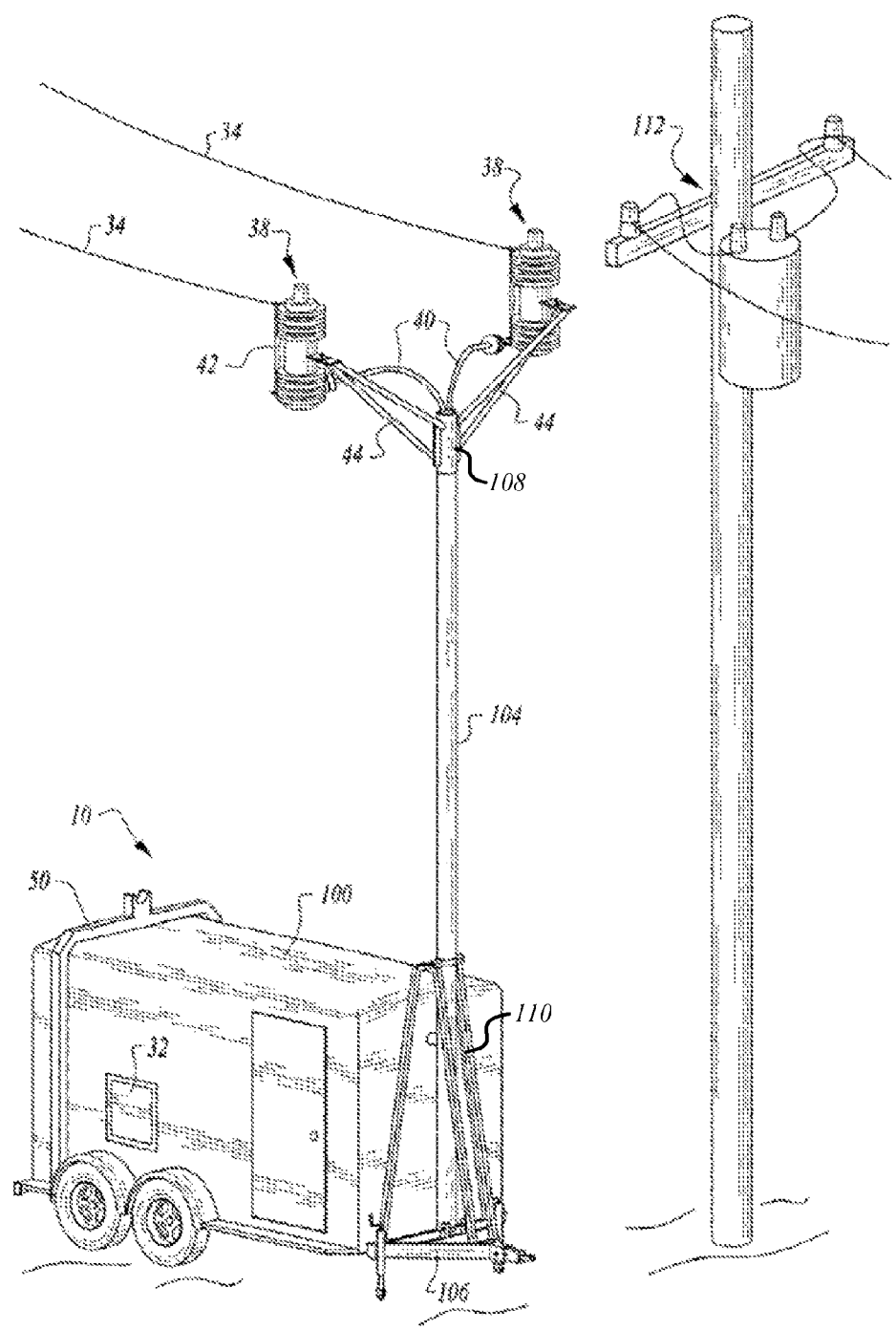
FIG. 1 depicts a perspective view of an embodiment of a portable primary voltage generator 10 having the primary overhead interface 38 erected and connected to power distribution lines while a section of the overhead source line or circuit 112 is de-energized with no other possible way of being re-energized.

Referring to FIGS. 1-9, an apparatus, a system, and methods of use for embodiments of portable primary voltage generator are disclosed.

As depicted in FIGS. 1-5, an embodiment of the PPVG 10 apparatus and system, includes a trailer 100 comprising an external surface comprising four side surfaces, a top surface, and a bottom surface, at least one enclosed area within the four side, top and bottom external surfaces comprising corresponding enclosed internal surfaces, at least one enclosed area entrance from one external side surface and a corresponding door, at least one hitch assembly, at least one axle, at least one overhead erectable structure 104 comprising a bottom end and a top end, at least one overhead erectable structure support assembly 106, at least one overhead erectable support structure pivot assembly 108, at least one overhead structure support assembly ground support assembly 110, at least one overhead erectable structure locking pin 46, and at least one overhead erectable structure holder assembly 50.

The at least one trailer enclosed area includes at least one generator 12, at least one secondary voltage regulator 14, at least one voltage synchronizer 16, at least one circuit breaker 18, at least one secondary voltage interface 20, at least one transformer 22, at least one temperature monitoring device 24, at least one transformer primary protection assembly 26 including disconnects and/or fuses, at least one potential transformer 28, and at least one current transformer 30, and at least one primary underground interface 36, FIGS. 1-6.

At least one telemetry display and control panel 32 is included on one trailer external side surface, FIGS. 1-6.

At least one primary overhead interface 38 is rotatably affixed to the at least one overhead erectable structure 104 top end, the primary overhead interface 38 comprising at least one riser termination 40, at least one overhead disconnect 42, and at least one cutout arm 44.

Shielded and grounded wiring connects the generator, regulator, synchronizer, circuit breaker, transformer, telemetry display and control panel, interface, components. An underground junction conduit port is provided in the trailer external bottom surface with corresponding riser neck into the at least one enclosed trailer area above the trailer enclosed floor. An overhead junction conduit port is provided in the trailer external side surface corresponding to the at least one overhead erectable structure support assembly 106 and into the at least one enclosed trailer area. As thus configured, FIGS. 1-6, the PPVG apparatus 10 provides an uninterrupted source of electrical power within a designed voltage range to utility customers while underground or overhead distribution power lines or circuits are otherwise being maintained or repaired through the primary underground interface 36 or the primary overhead interface 38 to an isolated power distribution system 34.

Figure 6:
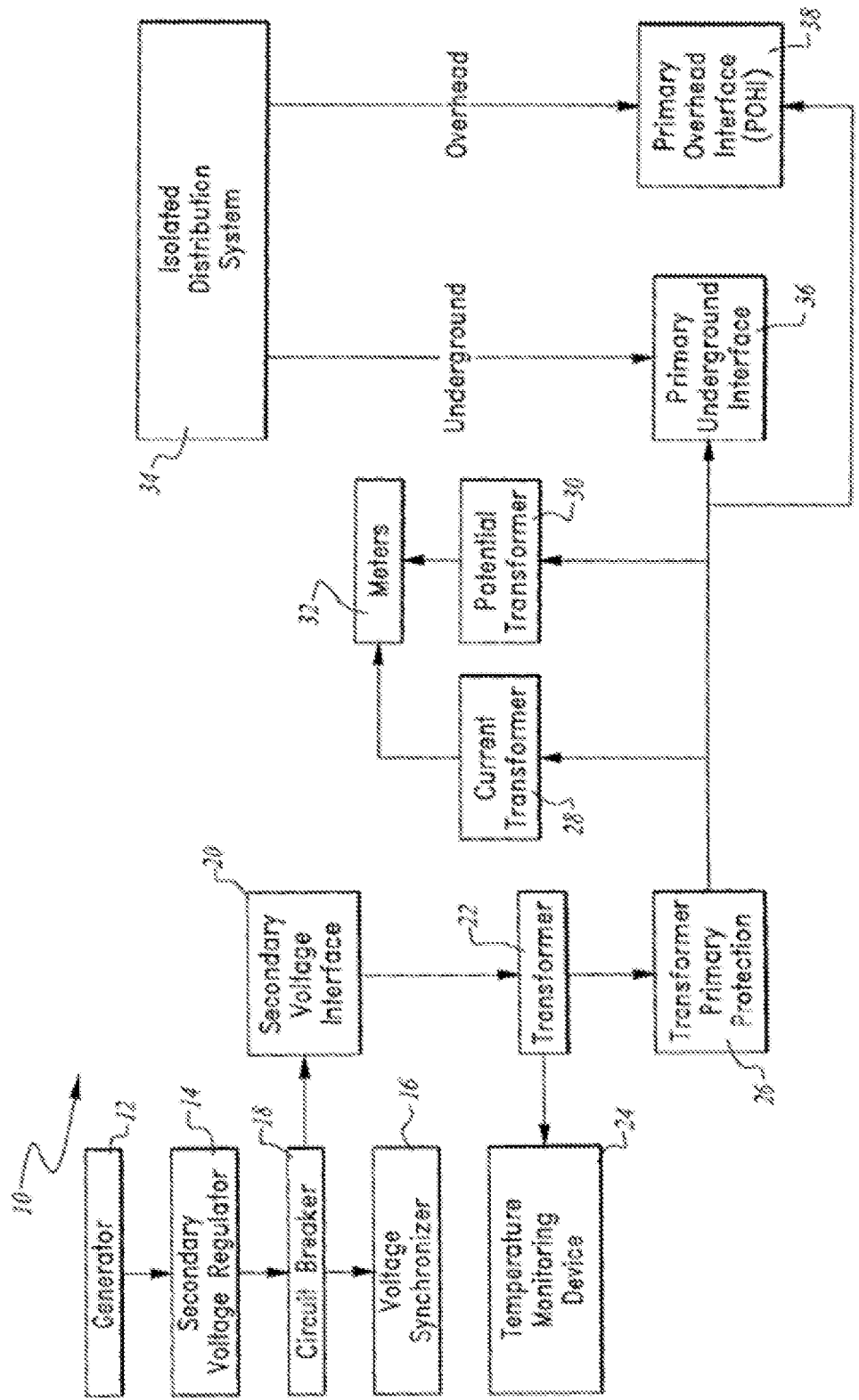
FIG. 6 depicts a system schematic of an embodiment of portable primary voltage generator 10.
Figure 9:
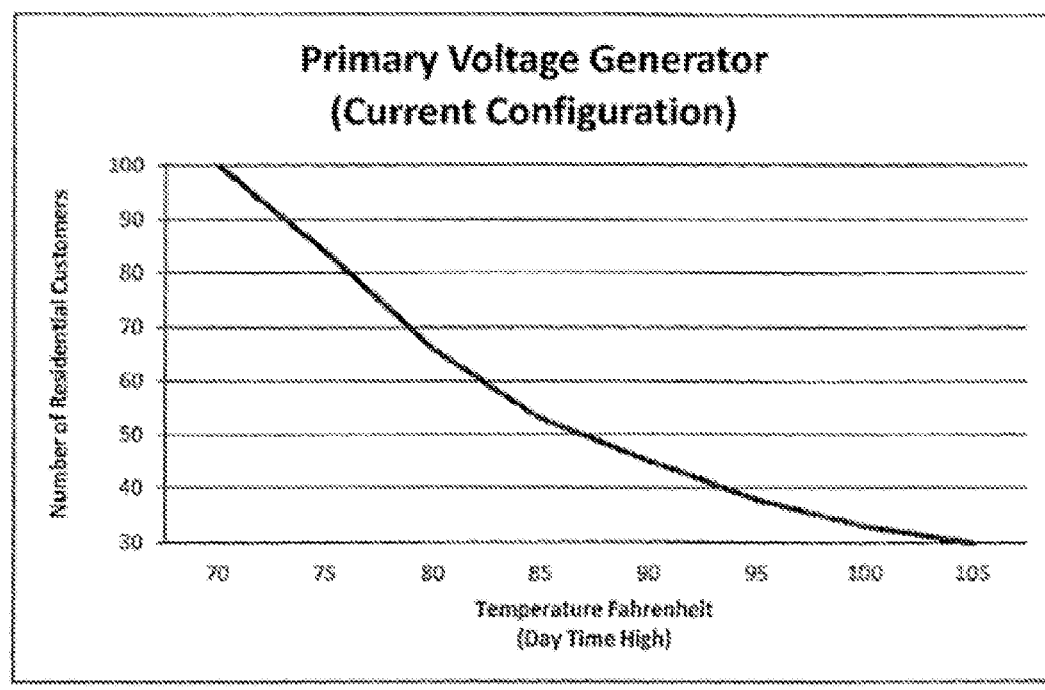
FIG. 9 depicts a graphic representation of the number of residential customers that can be supported by an embodiment of portable primary voltage generator 10 plotted against the daytime high ambient outside temperature in degrees Fahrenheit.

The connections to electrical power distribution lines are made by utility employees at either an underground junction box 102 or overhead transmission lines 112, FIGS. 1, 2, and 6. At no time will the operator of the PPVG apparatus 10 will touch or come within the distance limits set by the Occupational Safety and Health Administration ("OSHA") for energized apparatus or conductors. To assure proper voltage is maintained to utility customers, utility engineers assess the section of line that will be energized by the PPVG apparatus 10 to assure the load on the section of line will be within the capabilities of the PPVG apparatus 10. For example, FIG. 9 depicts a graphic representation of the number of residential customers that can be supported by an embodiment of portable primary voltage generator 10 plotted against the daytime high, ambient outside temperature in degrees Fahrenheit.

The appropriately engineered and designed PPVG apparatus 10 for this specific application is then maneuvered into position (and the overhead erectable structure erected for overhead applications) under the direction and supervision of a qualified employee of the utility or owner of the line. Prior to the PPVG apparatus 10 being connected to distribution lines the PPVG apparatus 10 is grounded using temporary ground rods with all components of the PPVG apparatus 10 at the same potential. Then the PPVG 10 is connected to the generator 12 for a specified, desired voltage range, depending on the load requirements and the PPVG apparatus components selected, through the secondary voltage interface 20, with the circuit breaker 18 at the secondary voltage regulator 14 closed. The generator 12 is started energizing the PPVG apparatus 10 to primary levels, with the possible potential ranging from 120 volts to 230,000 volts, depending upon the equipment. When the desired voltage, amperage, and temperature are verified through the telemetry display and control panel 32 the circuit breaker 18 is opened to de-energize the PPVG 10. At that time the connections are made to either the underground interface or the overhead interface with transformer primary protection 26 disconnects/fuses open. The PPVG apparatus 10 operator will then close the circuit breaker 18 energizing the PPVG apparatus 10 to the bottom side of the open transformer primary protection 26 disconnects/fuses. Then the utility employee closes disconnects/fuses at the transformer primary protection 26, reenergizing the section of distribution line and restoring power to the customers of the utility. Potential and current are monitored and maintained using telemetry 32 and a secondary voltage regulator 14 to maintain the delivered voltage within the standards set by the utility or owner of the line. The operation is reversed for removal of the PPVG 10 apparatus.

The transformer primary protection 26 for an embodiment of the PPVG apparatus 10 includes a fused disconnect/fuse cutout such as any of those manufactured by Kearney™, S&C™, ABB™, Cooper™, or Thomas and Betts™.

The transformer primary protection 26 for an embodiment of the PPVG apparatus 10 further includes a current limiting fuse, universal fuse, fault tamer fuse, and/or liquid fuse such as any of those manufactured by General Electric®, Cooper™, Thomas and Betts™, or Josyln™.

The transformer primary protection 26 for an embodiment of the PPVG apparatus 10 further includes recloser/interrupter/sectionalizer assemblies such as those manufactured by Cooper™ (DAS Switch w/iDC Control; Nova recloser w/control), Josyln™ (PowerMax w/control), McGraw Edison™ (Automatic recloser w/control), or Kyle™ (recloser w/control).

An embodiment of the PPVG apparatus 10 includes a telemetry display and control panel 32 which, inter alia, provides remote information gathering and monitoring for the secondary voltage interface 20, the transformer 22 temperature through a temperature monitoring device 24, the current transformer 28, and the potential transformer 30.

Figure 7A:
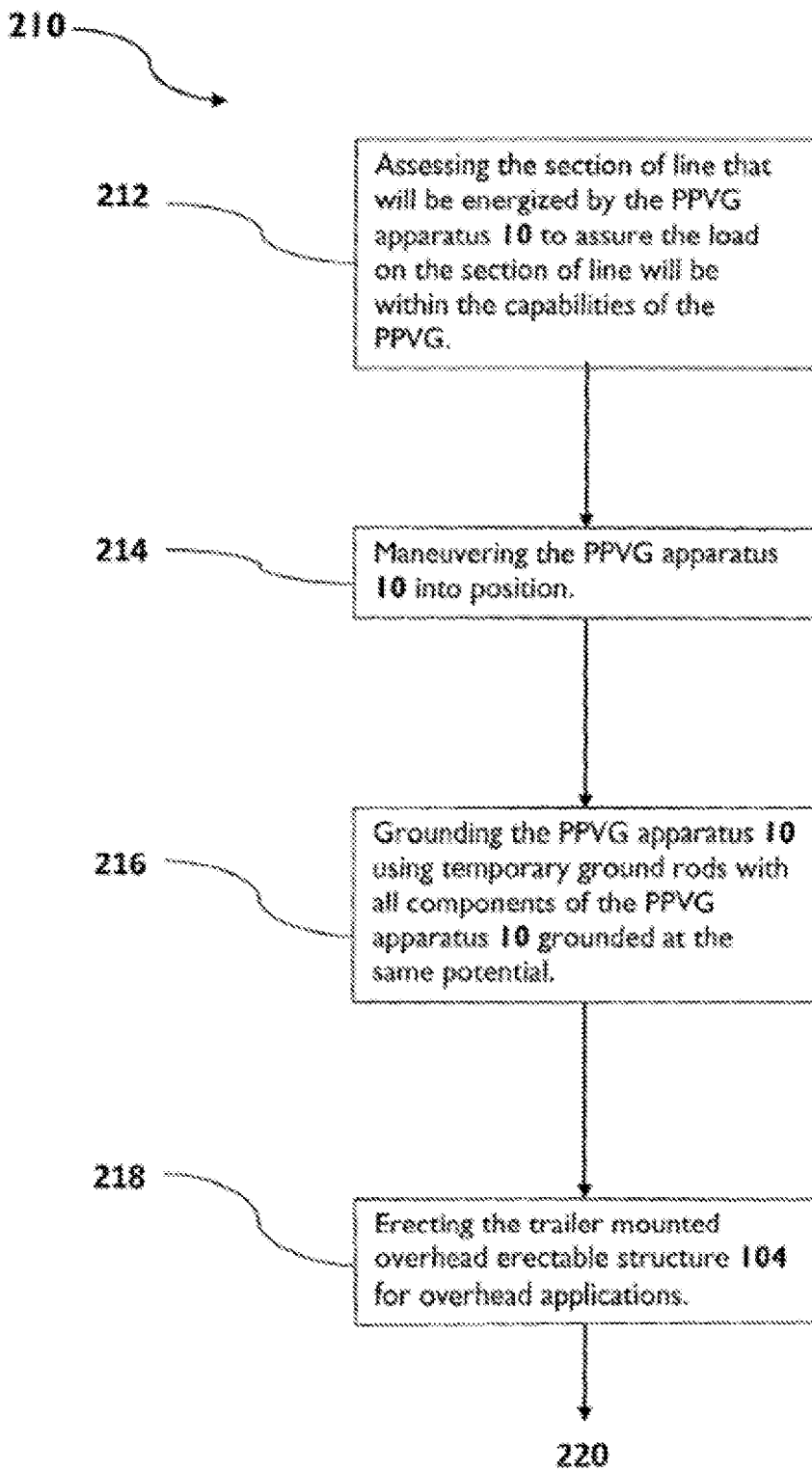
FIGS. 7A-7C depict a method 210 of using an embodiment of portable primary voltage generator 10 to energize a distribution power line.
Figure 7B:
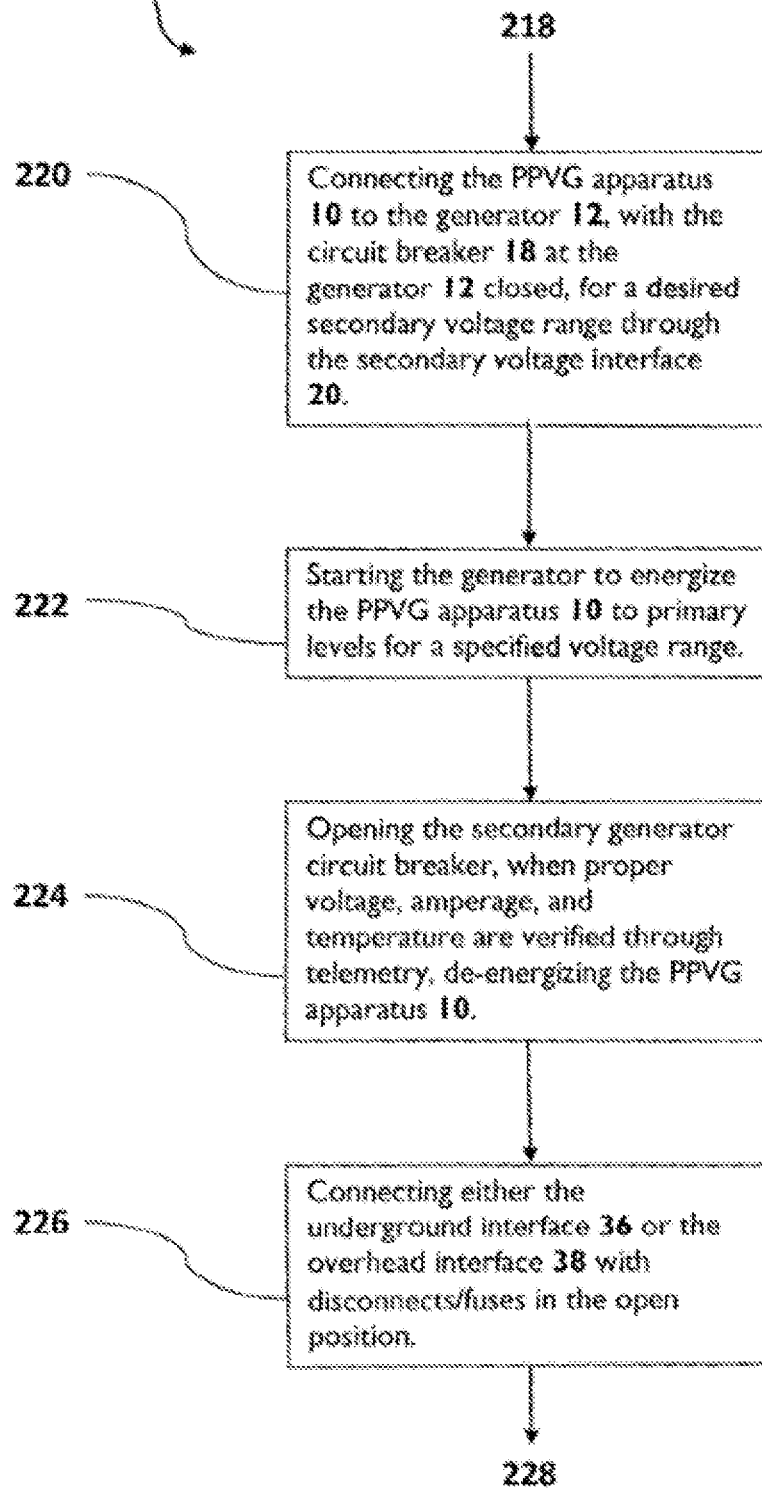
Figure 7C:
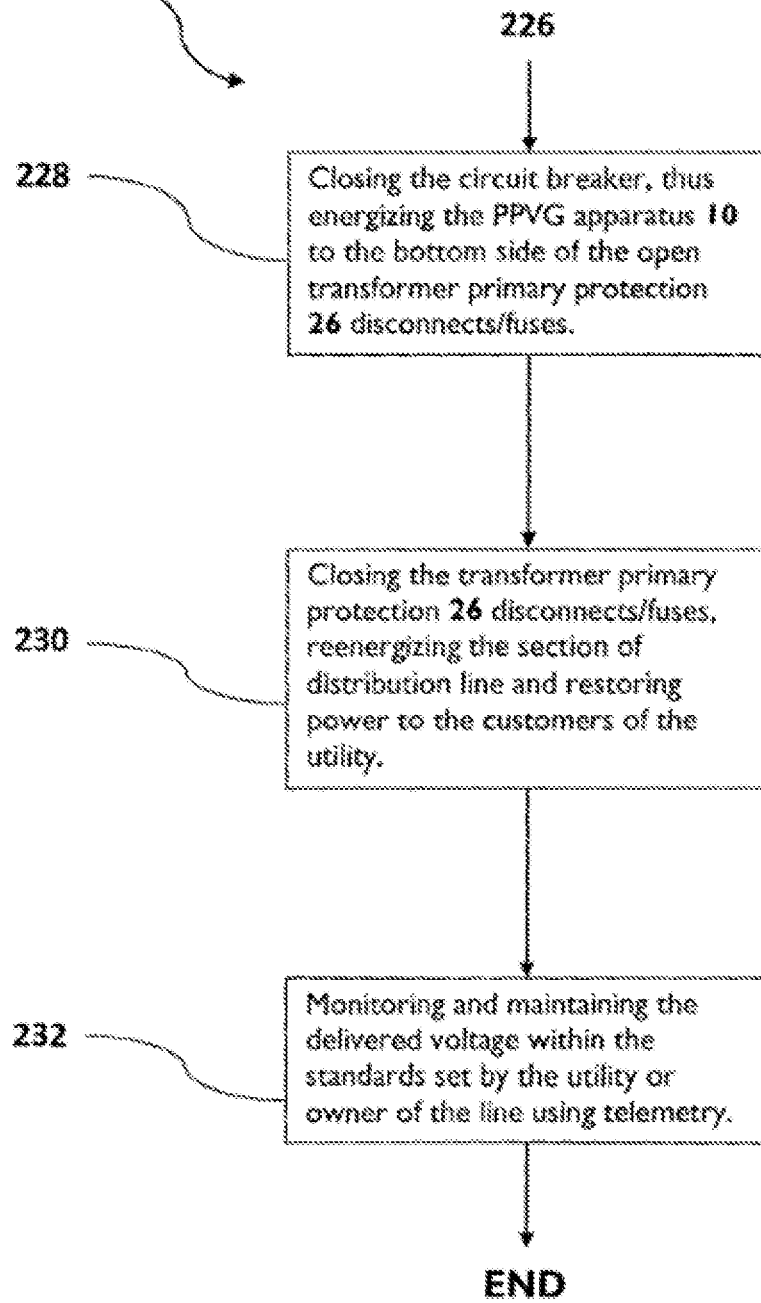

A method 210 of using an embodiment of the PPVG apparatus 10 and PPVG system to provide temporary power to underground or overhead distribution power lines while a section of the line or circuit is de-energized, FIGS. 7A-7C, includes the following steps:

1) assessing the section of line that will be energized by the PPVG apparatus 10 to assure the load on the section of line will be within the capabilities of the PPVG, 212;
2) maneuvering the PPVG apparatus 10 into position, 214;
3) grounding the PPVG apparatus 10 using temporary ground rods with all components of the PPVG grounded at the same potential, 216;
4) erecting the trailer mounted overhead erectable structure 104 for overhead applications, 218;
5) connecting the PPVG apparatus 10 to the generator 12, with the circuit breaker 18 at the generator 12 closed, for a desired secondary voltage range through the secondary voltage interface 20,220;
6) starting the generator to energize the PPVG apparatus 10 to primary levels for a specified voltage range, 222;
7) opening the secondary generator circuit breaker, when proper voltage, amperage, and temperature are verified through telemetry, de-energizing the PPVG apparatus 10,224;
8) connecting either the underground interface 36 or the overhead interface 38 with disconnects/fuses in the open position, 226;
9) closing the circuit breaker, thus energizing the PPVG apparatus 10 to the bottom side of the open transformer primary protection 26 disconnects/fuses, 228;
10) closing the transformer primary protection 26 disconnects/fuses, reenergizing the section of distribution line and restoring power to the customers of the utility, 230; and
11) monitoring and maintaining the delivered voltage within the standards set by the utility or owner of the line using telemetry, 232.

It would be understood by persons in the art that the PPVG apparatus and PPVG system are equivalent for practicing the foregoing steps for providing temporary power to underground or overhead distribution power lines while a section of the line or circuit is de-energized, FIGS. 7A-7C.

Figure 8A:
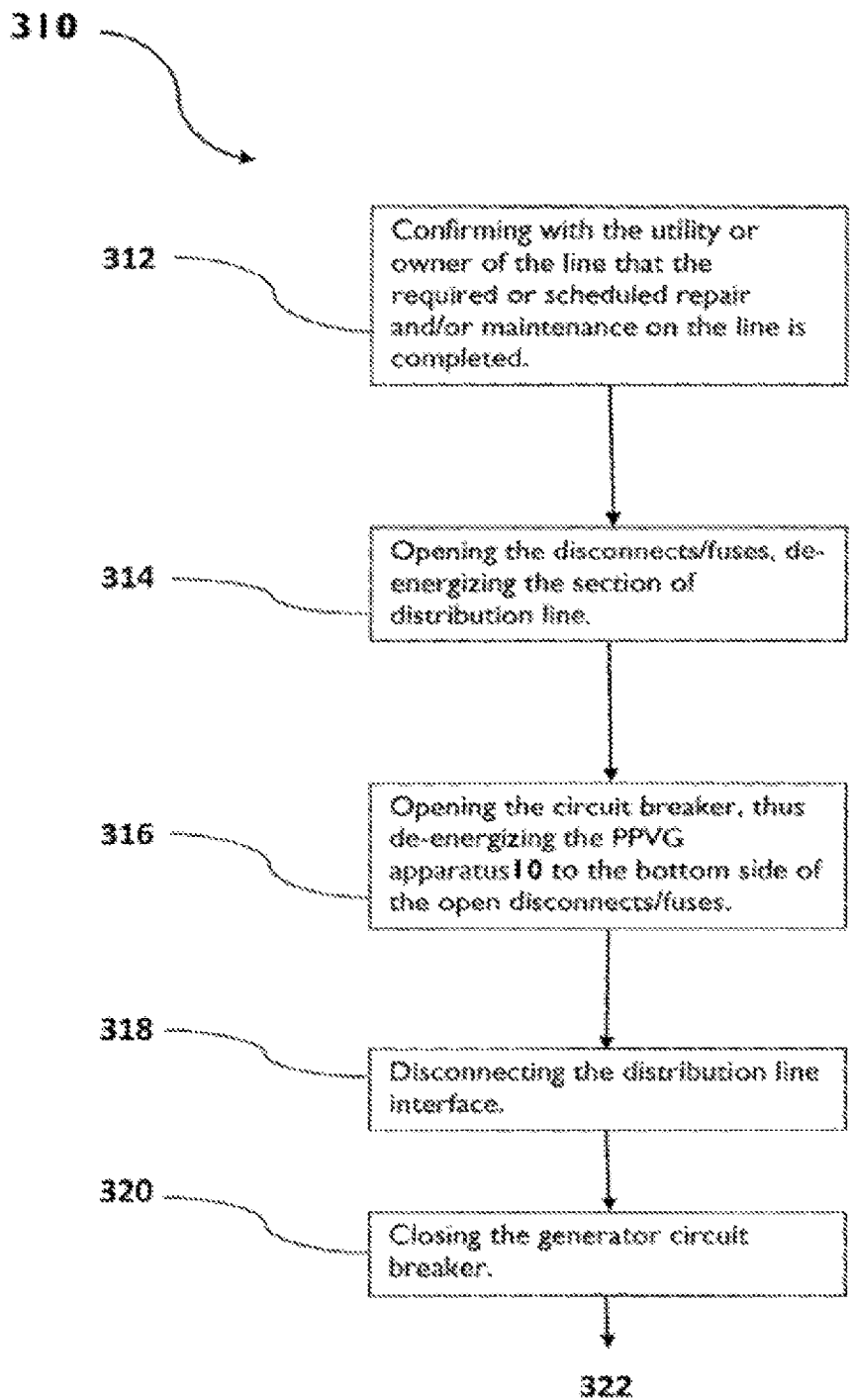
FIGS. 8A-8C depict a method 310 of terminating use of an embodiment of portable primary voltage generator 10 once repairs/maintenance to a distribution power line have been completed.
Figure 8B:
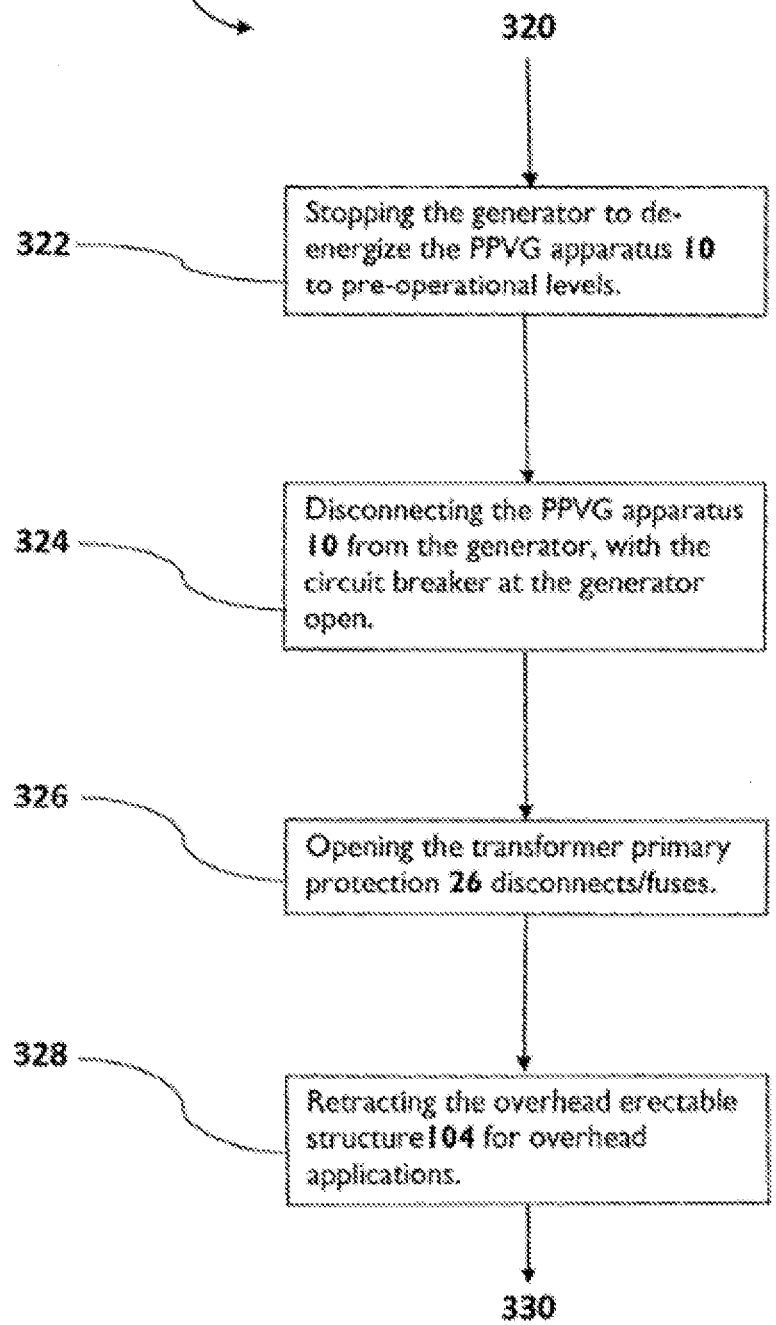
Figure 8C:
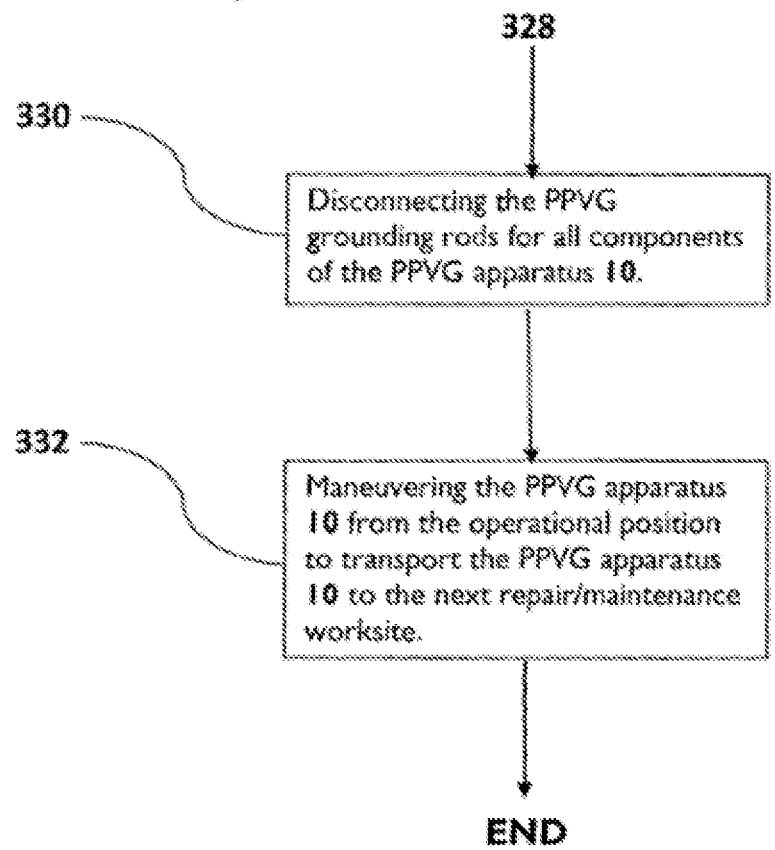

A method 310 of disconnecting an embodiment of the PPVG apparatus 10 and PPVG system from underground or overhead distribution power lines, FIGS. 8A-8C once the section of de-energized power line has been repaired, includes the following steps:

1) confirming with the utility or owner of the line that the required or scheduled repair and/or maintenance on the line is completed, 312;
2) opening the disconnects/fuses, de-energizing the section of distribution line, 314;
3) opening the circuit breaker, thus de-energizing the PPVG apparatus 10 to the bottom side of the open disconnects/fuses, 316;
4) disconnecting the distribution line interface, 318;
5) closing the generator circuit breaker, 320;
6) stopping the generator to de-energize the PPVG to pre-operational levels, 322;
7) disconnecting the PPVG apparatus 10 from the generator, with the circuit breaker at the generator open, 324;
8) opening the transformer primary protection 26 disconnects/fuses, 326;
9) retracting the overhead erectable structure 104 for overhead applications, 328;
10) disconnecting the PPVG grounding rods for all components of the PPVG apparatus 10,330; and
11) maneuvering the PPVG apparatus 10 from the operational position to transport the PPVG apparatus 10 to the next repair/maintenance worksite, 332.

It would be understood by persons in the art that the PPVG apparatus and PPVG system are equivalent for practicing the foregoing steps for disconnecting an embodiment of the PPVG.

An embodiment of the PPVG apparatus 10 includes transformer primary protective devices 26 selected from fuses, switches, fused switches, sectionalizer(s), line recloser(s), grounding bank(s), or any other type of automatic, automated, or controlled device to protect the transformer 22 from load side fault.

A specific embodiment of the PPVG apparatus 10 provides a voltage range of from 120 volts to 230,000 volts.

Another specific embodiment of the PPVG apparatus 10 provides a voltage range of from 601 volts to 35,000 volts.

An embodiment of the PPVG apparatus 10 includes a primary underground interface 36 that provides a trailer mounted junction box with load break and dead break bushing components.

For overhead power transmission line applications, an embodiment of the PPVG apparatus 10 includes the trailer mounted overhead erectable structure 104, an overhead erectable structure support assembly 106, an overhead erectable structure pivot assembly 108, and an overhead erectable structure ground support assembly 110, FIGS. 1, 4 and 5.

An embodiment of the PPVG apparatus 10 includes an overhead interface 38 that provides a trailer mounted overhead erectable structure 104 which when erected yields a structure for overhead disconnect/fuses for utility connections on overhead transmission lines 112. The top portion of the overhead erectable structure 104 includes a rotatable portion that allows the overhead disconnect/fuses to be readily positioned for connection to the potion of overhead transmission lines 112 required for power transmission to the utility users during the repair/maintenance procedures, FIG. 4. The overhead interface 38 of an embodiment of the PPVG apparatus 10 provides at least one riser termination 40, at least one overhead disconnect 42, and at least one cutout arm 44, FIG. 4.

An embodiment of the PPVG apparatus 10 includes an oil containment system that provides a fabricated catch basin and absorbent, such as PIG Corporation's PIG® sludge pellets, held within the trailer 100 around the trailer enclosed floor and up the trailer enclosed interior sides and the riser neck for a suitable dimension to contain oil in the event of a transformer 22 failure or leak.

An embodiment of the PPVG apparatus 10 includes a fire extinguishing/suppression system, such as the DuPont® Waterless Fire Suppression System, within the at least one enclosed trailer area comprising an integral plumbing assembly to automatically deliver a fire extinguishing chemical, such as the Du Pont® FM-200 Agent, to the PPVG 10 components within the at least one enclosed trailer area upon predetermined critical parameters or at predetermined telemetry set points. Alternative embodiments include ports in the sides of the enclosed trailer area for discharge of an ABC—Class fire extinguisher into the enclosed trailer area.

Accordingly, the PPVG apparatus 10, system, and corresponding methods for assembly, power distribution, and dis-assembly provide the flexibility of delivering an uninterrupted source of electrical power to utility customers while underground or overhead distribution power lines or circuits are otherwise being maintained or repaired. The methods and corresponding apparatus and system of the PPVG alleviate the existing limitations for maintenance or repair of these power lines or circuits. The PPVG apparatus 10, system and corresponding methods provide electrical utility companies with the ability of being able to address power line or circuit maintenance and repair issues without disruption of electrical power to those utility customers on the receiving end of the respective lines or circuits being maintained or repaired.

What is claimed is:

1. A system for providing temporary electrical power, the system comprising:
   a power source, wherein the power source provides electrical energy at a first voltage;
   a transformer, wherein:
      the transformer is electrically connected with the power source;
      the transformer steps up electrical energy at the first voltage, from the power source, to a second voltage; and
      the second voltage is equal to or between 601 volts and 35,000 volts;
   an interface, wherein:
      the interface is electrically connected with the transformer;
      the interface is configured to be energized at the second voltage from the transformer;
      the interface is configured to be electrically connected with an electrical-distribution system, to energize the electrical-distribution system to the second voltage; and
   a vehicle configured to transport the transformer.

2. The system as recited in claim 1, wherein the vehicle is a trailer.

3. The system as recited in claim 1, wherein the interface is configured to make an underground connection with the electrical-distribution system.

4. The system as recited in claim 1, wherein the interface is comprises:
   an overhead interface configured to connect with an overhead electrical-distribution system; and
   an underground interface configured to connect with an unground electrical-distribution system.

5. The system as recited in claim 1, wherein the vehicle comprises integral plumbing for fire suppression.

6. The system as recited in claim 1, wherein the vehicle comprises a catch basin to contain a possible leak from the transformer.

7. The system as recited in claim 1, wherein the power source is a generator.

8. The system as recited in claim 1, further comprising a fuse or a disconnect between the transformer and the interface.

9. A method for providing temporary electrical power, the method comprising:
   transporting a system for providing temporary electrical power, the system comprising:
      a power source, wherein the power source provides electrical energy at a first voltage;
      a transformer electrically connected with the power source; and
      an interface electrically connected with the transformer; connecting the interface to a section of an electrical-distribution system; providing electrical power at a first voltage, using the power source, to the transformer;
   stepping up the first voltage to a second voltage, using the transformer, wherein the second voltage is equal to or between 601 volts and 35,000 volts; and
   energizing the section of the electrical-distribution system to the second voltage, using the interface electrically connected with the transformer.

10. The method for providing temporary electrical power as recited in claim 9, the method further comprising verifying the section of an electrical-distribution system is not energized before connecting the interface to the section of the electrical-distribution system.

11. The method for providing temporary electrical power as recited in claim 9, wherein:
   the section of the electrical-distribution system comprise a power line;
   a utility company is responsible for maintenance of the power line; and
   the power line is used to provide electrical power to more than one customer of the utility company.

12. The method for providing temporary electrical power as recited in claim 9, the method further comprising assessing the section of the electrical-distribution system to assure a load of the section of the electrical-distribution system is within a capability of the system for providing temporary electrical power.

13. The method for providing temporary electrical power as recited in claim 12, wherein assessing the section of the electrical-distribution system to assure the load of the section of the electrical-distribution system is within the capability of the system for providing temporary electrical power is based on an outside temperature.

14. The method for providing temporary electrical power as recited in claim 9, the method further comprising monitoring electrical loads to keep within standards of a utility company that is responsible for the electrical-distribution system.

15. The method for providing temporary electrical power as recited in claim 9, the method further comprising grounding the system for providing temporary electrical power, with a temporary grounding rod, before energizing the section of the electrical-distribution system to the second voltage.

16. A method for providing temporary electrical power, the method comprising:
   assessing a section of line to be energized, wherein the section of line is part of an electrical-distribution system;
   maneuvering a system for providing temporary power into position;
   grounding the system for providing temporary power;
   opening a switch between an interface of the system for providing temporary power and a power source of the system for providing temporary electrical power;
   connecting the system for providing temporary power to the section of line to be energized;
   providing electrical power at a first voltage using the power source;
   stepping up the electrical power from the first voltage to a second voltage, using a transformer, wherein the second voltage is equal to or between 601 volts and 35,000 volts; and
   closing the switch, energizing the section of line to the second voltage.

17. The method for providing temporary electrical power as recited in claim 16, the method further comprising monitoring and maintaining, using telemetry, the second voltage to within a standard set by a utility or owner of the section of line.

18. The method for providing temporary electrical power as recited in claim 16, wherein energizing the section of line provides a plurality of customers electrical power.

19. The method for providing temporary electrical power as recited in claim 16, the method further comprising monitoring a temperature of the system for providing temporary power.

20. The method for providing temporary electrical power as recited in claim 16, wherein assessing the section of line to be energized includes determining a number of customers connected to the section of line.

* * * * *